(12) United States Patent
Ghosh

(10) Patent No.: US 10,608,867 B2
(45) Date of Patent: Mar. 31, 2020

(54) METHOD AND AN ELECTRONIC ARRANGEMENT FOR PROVIDING DEMAND-SUPPLY SERVICE OF PHYSICAL COMMUNICATION NETWORK RESOURCES

(71) Applicant: Comptel Oy, Helsinki (FI)

(72) Inventor: Tirthankar Ghosh, Maharashtra (IN)

(73) Assignee: Comptel Oy, Helsinki (FI)

( * ) Notice: Subject to any disclaimer, the term of this patent is extended or adjusted under 35 U.S.C. 154(b) by 9 days.

(21) Appl. No.: 16/018,402

(22) Filed: Jun. 26, 2018

(65) Prior Publication Data

US 2019/0394078 A1    Dec. 26, 2019

(51) Int. Cl.
*H04L 12/24* (2006.01)
*H04L 12/26* (2006.01)
*G06F 9/455* (2018.01)

(52) U.S. Cl.
CPC ........ *H04L 41/046* (2013.01); *G06F 9/45558* (2013.01); *H04L 43/04* (2013.01); *H04L 43/0876* (2013.01); *G06F 2009/45591* (2013.01); *G06F 2009/45595* (2013.01)

(58) Field of Classification Search
CPC ... H04L 41/046; H04L 43/04; H04L 43/0876; G06F 9/45558; G06F 2009/45591; G06F 2009/45595
USPC .......................................................... 709/220
See application file for complete search history.

(56) References Cited

U.S. PATENT DOCUMENTS

| | | | |
|---|---|---|---|
| 2015/0332351 A1* | 11/2015 | McBride | H04L 41/5054 705/14.73 |
| 2017/0093750 A1* | 3/2017 | McBride | H04L 47/805 |
| 2017/0371692 A1* | 12/2017 | Connolly | G06F 9/45558 |
| 2018/0317133 A1* | 11/2018 | Sciancalepore | H04W 16/02 |
| 2019/0109768 A1* | 4/2019 | Senarath | H04W 48/16 |
| 2019/0174322 A1* | 6/2019 | Deviprasad | H04W 16/10 |

* cited by examiner

*Primary Examiner* — James E Springer

(57) ABSTRACT

The invention makes it possible to offer unused network resources for another communication network operator very fast. VNF technology is utilized in a server that provides the inventive arrangement. The operator who wishes to offer unused capacity can offer physical resources through the server. The operator who wished to obtain the physical resources can request them from the server.

7 Claims, 3 Drawing Sheets

Figure 1:
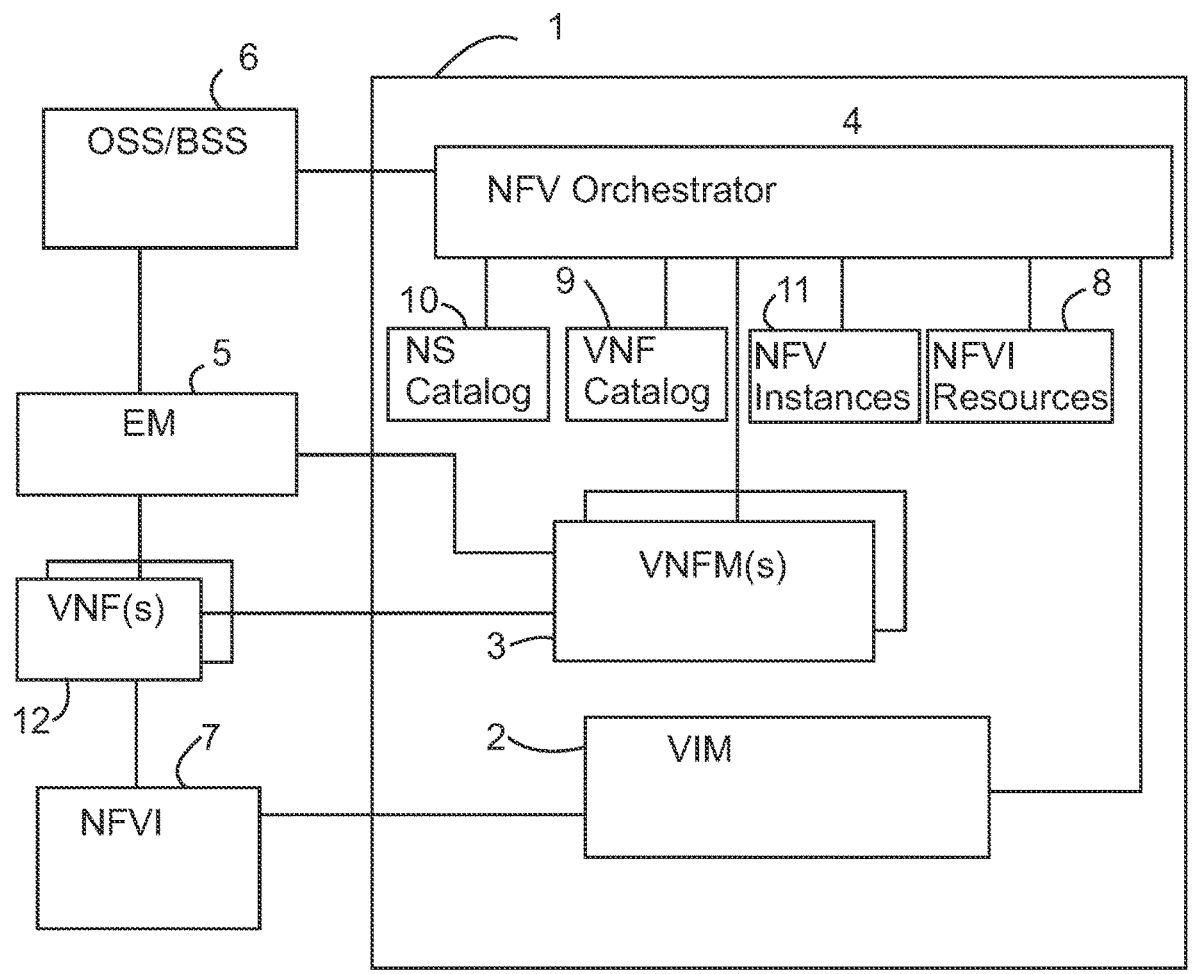

METHOD AND AN ELECTRONIC ARRANGEMENT FOR PROVIDING DEMAND-SUPPLY SERVICE OF PHYSICAL COMMUNICATION NETWORK RESOURCES

FIELD OF TECHNOLOGY

The invention relates to methods and electronic arrangements for providing demand-supply service of physical communication network resources. The communication network can be partly or entirely a mobile communication network.

BACKGROUND

Nowadays a communication network comprises a variety of different devices and techniques. There are several generations of networks like 2G, 3G and 4G, which are under use in mobile communication networks. Each network technique requires specific devices so the mobile communication network or a fixed communication network has a great number of different devices and management systems.

Therefore, network operators have a great collection of different device types, including routers, firewalls, session border controllers, switches, aggregators, VPN gateways, and a variety of other device types. These devices are constantly being developed and acquired, so equipment rapidly becomes obsolete and should be replaced. The launch of new services often demands network reconfiguration and on-site installation of new equipment which in turn requires additional space and power. Further, the network can have unused capacity, which is not utilized efficiently partly due to a great variety of the network devices and techniques.

Further, network functions can be virtualized utilizing a network function virtualization (NFV) technique in order to be processed on normal servers, like x86 servers. The network function virtualization (NFV) makes it possible to replace traditional network devices with software that exists on servers. This software performs the network functions previously provided by dedicated hardware. The combination of a server and software can replace a wide range of network devices, from switches and routers to firewalls and VPN (virtual private network) gateways. These new solutions may run on physical servers, virtual machines controlled by hypervisors hosted by appropriate hardware (e.g. server) or a combination of them. As can be noted, it is very challenging to allocate resources of a modern communication network.

A service provider, like a network operator, may have unused physical capacity (processing power, routing capacity etc.), which the operator does not need himself, but wishes to utilize if possible. On the other hand, another service provider may need extra capacity, but does not wish to invest to new physical devices. There are known solutions in order that the service provider with extra capacity may offer capacity to another servicer provider who needs more capacity. An IP Multimedia Subsystem (IMS) is an architectural framework for delivering IP multimedia services, which is commonly used for this purpose. Although the known solutions as such works properly, they may be relatively slow. For example, a service provider may have need for extra capacity to a summer season only in a certain geographical area. Then a period of days or longer for achieving the extra capacity may be noticeable with respect to the season time.

SUMMARY OF THE INVENTION

The object of the invention is to alleviate the problem said above, namely the period required for providing demand-supply service of physical communication network resources and provide an alternative solution with respect to known solutions. The invention is achieved as described in the independent claims. Dependent claims illustrate different embodiments of the invention.

The invention provides an electronic arrangement for providing demand-supply service of physical network resources, such as host computers capable of running VNFs, to communication service providers. The arrangement comprises data interfaces for transferring data, at least one processing unit for processing instructions, functions and other data, and at least one memory for storing the instructions and other data. Said at least one processing unit is configured, in accordance with the stored instructions, to cause:

obtaining:
a) indication of a communication service provider that offers physical network resources, and indication of a physical service area relating to the physical network resources offered,
b) monitoring information describing the physical network resources that are available, such as host computer devices, said monitoring information being gathered through one or more monitoring software agents running on a network of said physical service area, and
c) indication of conditions set by the communication service provider for allowing another communication service provider to utilize said available physical network resources for providing services to users of the other communication service provider through NFV technology, determining VNF descriptors for the offered physical network resources based on the obtained indications and monitoring information, obtaining, from a system of the other service provider, a request for physical network resources in order to provide services to users of the other service provider, said request indicating a target area and requirements regarding VNFs to be run in order to implement the service, determining, based on the VNF descriptors and the request, one or more physical networks that suit running the VNFs, transmitting an indication of the determined suitable physical networks and said conditions to the system of the other service provider, and receiving, from the system of the other service provider, an indication of a selection from the suitable physical networks, building and delivering, based on said indication of the selection from the suitable physical networks, VNFM specific VNF descriptors in order to supply the physical network resources for the other service provider.

SHORT DESCRIPTION OF THE FIGURES

Figure 2:
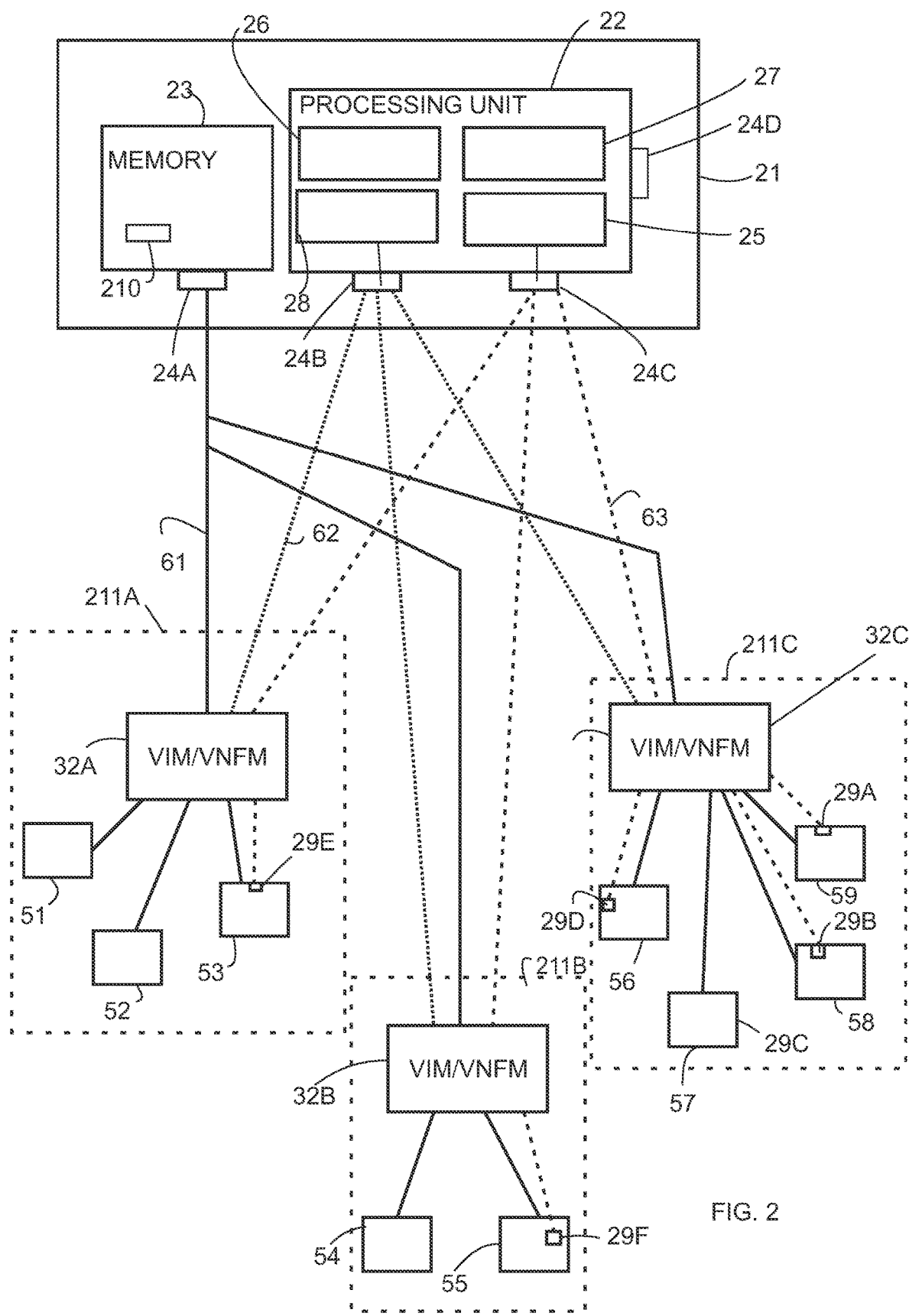
Figure 3:
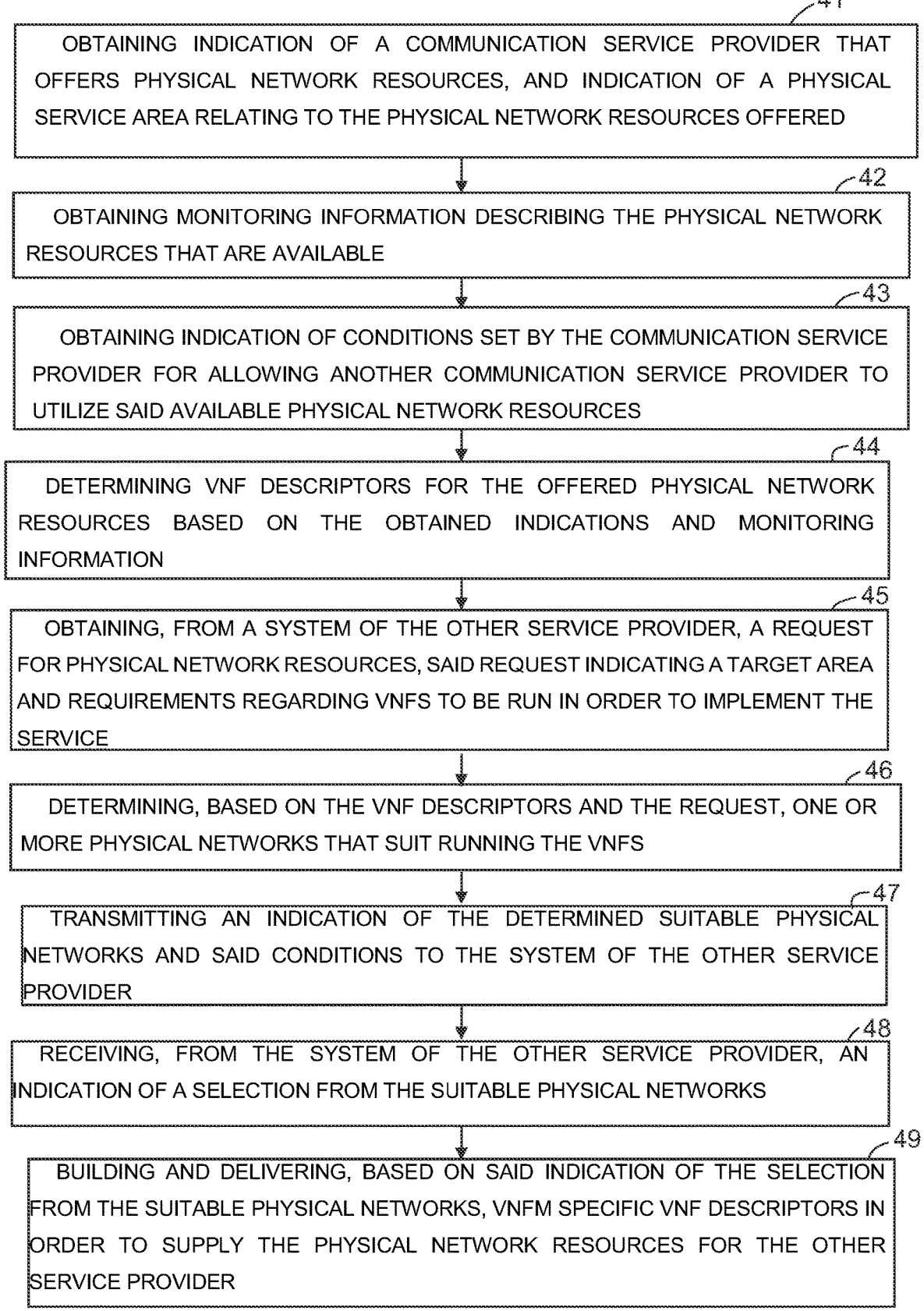

In the following, the invention is described in more detail by reference to the enclosed drawings, where FIG. 1 illustrates an example of a NFV management and orchestration system, FIG. 2 illustrates an example of an inventive arrangement, and FIG. 3 illustrates an example of a method according to the invention.

DESCRIPTION OF THE INVENTION

In order to understand the invention FIG. 1 illustrates an example of the structure of the NFV. As all communication network techniques, the NFV needs also management system which is called a NFV Management and Orchestration (MANO) 1. The MANO comprises several managers, a VIM manager (Virtualized Infrastructure Manager) 2, a VNM manager(s) (VNFM) 3, and a NFV orchestrator (NFVO) 4. The VNFM is connected to a traditional element management (EM) 5, and the NFVO to a traditional OSS/BSS (Operational Support System/Base Station Subsystem) 6. The traditional systems exchange information with the MANO.

Further, FIG. 2 shows a NFVI (NFV Infrastructure) 7 that illustrates underlying infrastructure including servers, storages etc, virtual resources (Virtual Machines) and software resources (hypervisor) in the NFV environment). The VIM manages NFVI resources in one domain.

It is possible that there may be multiple VIMs in the NFV architecture, each managing its respective NFV Infrastructure (NFVI). The VIM further manages life cycle of virtual resources in an NFVI domain, keeps inventory of virtual machines (VMs) associated with physical resources, provide performance and fault management of hardware, software and virtual resources, and exposes physical and virtual resources to other management systems.

The VNFM 3 manages VNFs 12. VNFs are virtualized network elements like Router VNF, Switch VNF etc. The VNFM manages life cycle of VNFs. It creates, maintains and terminates VNF instances. Further, the VNFM handles fault, configuration, accounting, performance and security management tasks of VNFs. As showed in FIG. 2, there can be multiple VNFMs managing separate VNFs or there can be one VNFM managing multiple VNFs.

The NFVO 4 coordinates, authorizes, releases and engages NFVI resources among different artificial interface points or point between communicating entities, which are also called points of presence (PoP). The connections with the VIMs are made through the NFVI APIs (Application Programming Interface) instead of engaging with the NFVI resources, directly. So, resource allocation from different VIMs is handled in this way.

Service Orchestration creates end to end service between different VNFs. It achieves this by coordinating with the respective VNFMs so it does not need communicate to VNFs directly. For example, a service between the base station VNF's of one area and core node VNF's of another area can be created. The Service Orchestration can instantiate VNFMs if needed and it handles a topology management of the network services instances.

There are also four types of repositories: a VNF catalog 9, a network services (NS) catalog 10, NFV Instances 11, and NFVI resources 8.

The VNF Catalog 9 is a repository of all usable VNFDs (VNF Descriptor). The VNFD is a deployment template which describes a VNF in terms of its deployment and operational behavior requirements. It is primarily used by VNFM in the process of VNF instantiation and lifecycle management of a VNF instance. The information provided in the VNFD is also used by the NFVO to manage and orchestrate network services and virtualized resources on NFVI.

The NS catalog 10 is list of the usable network services. A deployment template for a network service in terms of VNFs and description of their connectivity through virtual links is stored in NS Catalog. The NFV Instances 11 holds all details about network service instances and related VNF Instances. The NFVI Resource repository 8 is a repository of resources utilized for the purpose of establishing NFV services.

So, the communication network has a great number of different devices and structures, further there are new solutions which works together with previous devices. It infrastructure of the network is changing all the time.

FIG. 3 illustrates an example of the invention, namely the electronic arrangement for providing demand-supply service of physical network resources, such as host computers capable of running VNFs, to communication service providers. The arrangement can be implemented with a server 21 of the provider that provides the inventive service.

The arrangement comprising data interfaces 24A-24D for transferring data, at least one processing unit 22 for processing instructions, functions and other data, and at least one memory 23 for storing the instructions and other data. Said at least one processing unit 22 is configured, in accordance with the stored instructions, to cause the next functions described below.

The processing unit is arranged to obtain:
a) indication of a communication service provider that offers physical network resources, and indication of a physical service area relating to the physical network resources offered,
b) monitoring information describing the physical network resources that are available, such as host computer devices, said monitoring information being gathered through one or more monitoring software agents running on a network of said physical service area, and
c) indication of conditions set by the communication service provider for allowing another communication service provider to utilize said available physical network resources for providing services to users of the other communication service provider through NFV technology.

Further the processing unit is arranged to determine VNF descriptors for the offered physical network resources based on the obtained indications and monitoring information, and to obtain, from a system of the other service provider, a request for physical network resources in order to provide services to users of the other service provider, said request indicating a target area and requirements regarding VNFs to be run in order to implement the service. The target area indicates the area wherein the other service provider wants to offer services for customers.

The processing unit is also arranged to determine, based on the VNF descriptors and the request, one or more physical networks 211A, 211B, 211C that suit running the VNFs, and transmitting an indication of the determined suitable physical networks and said conditions to the system of the other service provider. The suitable network/s is determined since several NFVIs provides the physical network resources in question. Further, the processing unit is arranged to receive, from the system of the other service provider, an indication of a selection from the suitable physical networks, to build and deliver, based on said indication of the selection from the suitable physical networks, VNFM 32A, 32B, 32C specific VNF descriptors in order to supply the physical network resources for the other service provider.

The interfaces 24A-24D of the system have a physical base, being one or more physical interfaces, but the interfaces are also logical interfaces for different functions and modules.

In FIG. 2 it can be seen that each communication service provider, like a network operator, has its own network 211A-211C, but each communication service provider may have also several physical networks. Each physical network in FIG. 2 comprises hardware 51-59, like routers, servers, nodes etc. The hardware contains NFVI-PoPs. In order to illustrate the invention, the VIMNNFMs 32A-32C are also included into the each physical network in the example of FIG. 2. However, the VIMNNFMs can be in another network if the network operator uses a NFV vendor/s. It worth of noting that the VIMs and VNFMs can also be situated separately and not together as in FIG. 2. See FIG. 1. So, the connections 61, 62, 63 between the server 21 and the VIMNNFMs in FIG. 2 illustrate more like logical connections, so they all may be carried on the same physical connection, or separate physical connections.

The arrangement can be arranged to comprise an event module 25, a designer module 26, a physical inventory module 27, and a tool module 28. The modules can be software entities and are arranged to run in said at least one processor 22.

The event module 25 is arranged to obtain said monitoring information. In practice, it is convenient that the arrangement comprises said monitoring agents 29A-29F. The monitoring agents are deliverable to the physical network resources 51-59. The delivery happens, for example, when the communication servicer provider wishes to offer its unused physical recourses to other communication service providers via a portal (like a web page) for the inventive service. Each monitoring agent is arranged to collect data from the physical network resource where it is going to run and arranged to feed 63 data to the event module 25. Said at least one memory 23 can comprise a VNF repository 210 wherefrom the monitoring agents are downloadable for monitoring the physical network resources.

The designer module 26 is arranged to cause said determining of the VNF descriptors, and also to utilize said VNF descriptors, the request and the physical inventory module in order to cause, said determination of one or more physical networks that suit running the VNFs.

The physical inventory module 27 being arranged to provide PNFD (Physical Network Function Descriptor) data. The physical inventory module 27 handles physical features of the hardware and also provides a location map. The map information helps also helps to illustrate said suitable physical network. The tool module 28 is arranged to provide said building and delivering of the VNFM specific VNF descriptors. The designer module 26 may use a different format than the format that is used for the delivering 62. So, it can be noticed from FIGS. 1 and 2 that the modules 25-28 are parts of the NFVO 4.

It is also possible that the said indication of the selection from the suitable physical networks is also arranged to be received through download of the VNFs from one or more VNF vendor of the first communication service provider.

So, the invention enables a network operator to offer his ready-to-share physical network resources to another operator. The other operator who is seeking network expansion into unfamiliar territories can look up the offered resource from the inventive arrangement. The operator who is offering the resources and the other operator who is seeking resources can access to the inventive service through portals, like web pages. The seeker can select a suitable network service that is offered and deploy VNFs to suffice the need. The resources can also be withdrawn through the portals. All these in matter of seconds. So, the invention provides much faster solution than any known arrangements.

In other words, it is possible that a provider, who wants, to share his physical presence, downloads an application on to his physical box (commodity hardware). The application does not make the device an interconnection gateway. It is like a daemon process that keeps running and sends diagnostic information (CPU, memory, storage, location, overall condition, maintenance logins and user logs, connection info, etc.) of the box to the global database of the inventive arrangement. The application is not a VNF, in the sense, that it does not perform any networking duties. It is more of a monitoring application. If the application gets removed from a physical device, that device gets removed from the global database, as well.

A provider who is looking for physical resources can put forward a request with the database of the invention, with VNF requirements and a target area. The inventive arrangement knows exactly where its monitoring agents are running and their feedback. The arrangement checks feasibility and answers with a network plan and also price (the answer can propose several plans with different rates). The provider who seeks the resources can agree and install VNFs onto the physical hosts from provider who is offering the resources. As said the network resources can be taken into the operation in a few seconds.

So, the inventive method provides demand-supply service for physical network resources, such as host computers capable of running VNFs, to communication service providers. The method is arranged to cause
  obtaining:
    a) indication 41 of a communication service provider that offers physical network resources, and indication of a physical service area relating to the physical network resources offered,
    b) monitoring information 42 describing the physical network resources that are available, such as host computer devices, said monitoring information being gathered through one or more monitoring software agents running on a network of said physical service area, and
    c) indication of conditions set by the communication service provider 43 for allowing another communication service provider to utilize said available physical network resources for providing services to users of the other communication service provider through NFV technology,
  determining VNF descriptors for the offered physical network resources 44 based on the obtained indications and monitoring information,
  obtaining, from a system of the other service provider, a request for physical network resources 45 in order to provide services to users of the other service provider, said request indicating a target area and requirements regarding VNFs to be run in order to implement the service,
  determining, based on the VNF descriptors and the request, one or more physical networks that suit running the VNFs 46,
  transmitting an indication of the determined suitable physical networks and said conditions to the system of the other service provider 47,
  receiving, from the system of the other service provider, an indication of a selection from the suitable physical networks 48, and building and delivering, based on said indication of the selection from the suitable physical networks, VNFM specific VNF descriptors 49 in order to supply the physical network resources for the other service provider.

It is evident from the above that the invention is not limited to the embodiments described in this text but can be implemented in many other different embodiments within the scope of the independent claims.

The invention claimed is:

1. An electronic arrangement for providing demand-supply service of physical network resources, such as host computers capable of running Virtual Network Functions (VNFs), to communication service providers, the arrangement comprising: data interfaces for transferring data;
at least one processing unit for processing instructions, functions and other data; and
at least one memory for storing the instructions and other data, wherein said at least one processing unit being configured, in accordance with the stored instructions, to cause:
obtaining:
a) indication of a communication service provider that offers physical network resources, and indication of a physical service area relating to the physical network resources offered,
b) monitoring information describing the physical network resources that are available, such as host computer devices, said monitoring information being gathered through one or more monitoring software agents running on a network of said physical service area, and
c) indication of conditions set by the communication service provider for allowing another communication service provider to utilize said available physical network resources for providing services to users of the other communication service provider through Network Function Virtualization (NFV) technology,
determining VNF descriptors for the offered physical network resources based on the obtained indications and monitoring information,
obtaining, from a system of the other service provider, a request for physical network resources in order to provide services to users of the other service provider, said request indicating a target area for the service delivery and requirements regarding VNFs to be run in order to implement the service,
determining, based on the VNF descriptors and the request, one or more physical networks that suit running the VNFs,
transmitting an indication of the determined suitable physical networks and said conditions to the system of the other service provider,
receiving, from the system of the other service provider, an indication of a selection from the suitable physical networks, and
building and delivering, based on said indication of the selection from the suitable physical networks, Virtual Network Function Manager (VNFM) specific VNF descriptors in order to supply the physical network resources for the other service provider.

2. The electronic arrangement according to claim 1, wherein the arrangement comprises an event module, a designer module, a physical inventory module, and a tool module, which modules are arranged to run in said at least one processor,
the event module being arranged to obtain said monitoring information,
the designer module being arranged to cause said determining of the VNF descriptors,
the designer module being also arranged to utilize said VNF descriptors, the request and the physical inventory module in order to cause said determination of one or more physical networks that suit running the VNFs,
a physical inventory module being arranged to provide data, and
a tool module that is arranged to provide said building and delivering of the VNFM specific VNF descriptors.

3. The electronic arrangement according to claim 1, wherein the modules are parts of a Network Function Virtualization Orchestrator (NFVO.

4. The electronic arrangement according to claim 3, wherein the arrangement comprises said monitoring agents that are deliverable to the physical network resources, each monitoring agent being arranged to collect data from the physical network resource where it is going to run and arranged to feed data to the event module.

5. The electronic arrangement according to claim 4, wherein said at least one memory comprises a VNF repository wherefrom the monitoring agents are downloadable for monitoring the physical network resources.

6. The electronic arrangement according to claim 5, wherein said indication of the selection from the suitable physical networks is also arranged to be received through download of the VNFs from one or more VNF vendors of the first communication service provider.

7. A method for providing demand-supply service for physical network resources, such as host computers capable of running Virtual Network Functions (VNFs), to communication service providers, which method is arranged to cause:
obtaining:
a) indication of a communication service provider that offers physical network resources, and indication of a physical service area relating to the physical network resources offered,
b) monitoring information describing the physical network resources that are available, such as host computer devices, said monitoring information being gathered through one or more monitoring software agents running on a network of said physical service area, and
c) indication of conditions set by the communication service provider for allowing another communication service provider to utilize said available physical network resources for providing services to users of the other communication service provider through Network Function Virtualization (NFV) technology,
determining VNF descriptors for the offered physical network resources based on the obtained indications and monitoring information,
obtaining, from a system of the other service provider, a request for physical network resources in order to provide services to users of the other service provider, said request indicating a target area and requirements regarding VNFs to be run in order to implement the service,
determining, based on the VNF descriptors and the request, one or more physical networks that suit running the VNFs,
transmitting an indication of the determined suitable physical networks and said conditions to the system of the other service provider, receiving, from the system of the other service provider, an indication of a selection from the suitable physical networks, and building and delivering, based on said indication of the selection from the suitable physical networks, Virtual Network Function Manager (VNFM) specific VNF descriptors in order to supply the physical network resources for the other service provider.

\* \* \* \* \*